United States Patent
Mian (10) Patent No.: US 10,873,831 B2
(45) Date of Patent: Dec. 22, 2020

(54) SENSITIVE AREA MANAGEMENT

(71) Applicant: International Electronic Machines Corp., Troy, NY (US)

(72) Inventor: Zahid F. Mian, Loudonville, NY (US)

(73) Assignee: International Electronic Machines Corp., Troy, NY (US)

( * ) Notice: Subject to any disclaimer, the term of this patent is extended or adjusted under 35 U.S.C. 154(b) by 0 days.

(21) Appl. No.: 16/422,424

(22) Filed: May 24, 2019

(65) Prior Publication Data

US 2019/0364387 A1 Nov. 28, 2019

Related U.S. Application Data

(60) Provisional application No. 62/675,840, filed on May 24, 2018.

(51) Int. Cl.
*H04W 4/029* (2018.01)
*B64C 39/02* (2006.01)

(52) U.S. Cl.
CPC .......... *H04W 4/029* (2018.02); *B64C 39/024* (2013.01); *B64C 2201/123* (2013.01)

(58) Field of Classification Search
CPC ...... G01S 19/48; G01S 5/0072; G01S 5/0257; G01S 5/0284; G01S 5/10; G01S 5/14; G01S 5/0205; G01S 13/885; G01S 17/06; G01S 17/89; G01S 7/4808; G01S 7/4813; G01S 7/4817; H04W 4/029; H04W 4/027; H04W 4/38; H04W 4/40; H04W 4/50; H04W 4/70; H04W 84/18

See application file for complete search history.

(56) References Cited

U.S. PATENT DOCUMENTS

| 9,678,507 B1 | 6/2017 | Douglas et al. |
| 9,740,200 B2 | 8/2017 | Bethke et al. |
| 9,786,165 B2 | 10/2017 | Sham |

(Continued)

FOREIGN PATENT DOCUMENTS

| KR | 20170138225 A | 12/2017 |
| KR | 101835516 B1 | 4/2018 |

(Continued)

OTHER PUBLICATIONS

Kang, M. J., Application No. PCT/US2019/033988, Search Report and Written Opinion, dated Oct. 2, 2019, 11 pages.

(Continued)

*Primary Examiner* — Quan M Hua
(74) *Attorney, Agent, or Firm* — LaBatt, LLC (57) ABSTRACT

An unmanned mobile observation device, such as an unmanned aerial vehicle, can be used to acquire observation data for a sensitive area. The observation data can include image data and geolocation data corresponding to a real-world geographic location at which the image data was acquired. The geolocation data can be accurate to five centimeters or less. The observation data can be evaluated to identify any defects within the sensitive area. Such evaluation can include comparison with previously acquired image data for the sensitive area, which can be enables by using the geolocation data to select the corresponding previously acquired image data.

20 Claims, 6 Drawing Sheets

(56) References Cited

U.S. PATENT DOCUMENTS

| | | | | |
|---|---|---|---|---|
| 2014/0133775 A1* | 5/2014 | Wang | ............ | G06T 5/002 |
| | | | | 382/264 |
| 2016/0371544 A1* | 12/2016 | MacDonald | ............ | G01B 11/02 |
| 2017/0006417 A1* | 1/2017 | Canoy | ............ | H04W 12/10 |
| 2017/0041763 A1 | 2/2017 | Jalali | | |
| 2017/0192418 A1* | 7/2017 | Bethke | ............ | G05D 1/0094 |
| 2017/0192422 A1 | 7/2017 | Kim et al. | | |
| 2019/0041856 A1* | 2/2019 | Hippelein | ............ | G06K 9/00637 |
| 2020/0006415 A1* | 1/2020 | Matsugai | ............ | B29D 11/00375 |

FOREIGN PATENT DOCUMENTS

| | | |
|---|---|---|
| KR | 101846519 B1 | 4/2018 |
| KR | 101843836 B1 | 5/2018 |

OTHER PUBLICATIONS

Ben-Ezra, M., Nayar S. K., "Motion Deblurring Using Hybrid Imaging," Computer Science Department, Columbia University, 2003, 8 pages.

Ben-Ezra, M., Nayar S. K., "Motion-Based Motion Deblurring," IEEE Transactions on Pattern Analysis and Machine Intelligence, vol. 26, No. 6, Jun. 2004, 10 pages.

\* cited by examiner

SENSITIVE AREA MANAGEMENT

REFERENCE TO RELATED APPLICATIONS

The current application claims the benefit of U.S. Provisional Application No. 62/675,840, titled "UAV-Based Inspection Platform for Infrastructure Monitoring," which was filed on 24 May 2018, and which is hereby incorporated by reference.

TECHNICAL FIELD

The disclosure relates generally to managing an area, and more particularly, to managing an area using electromagnetic data acquired over time.

BACKGROUND ART

Millions of people in the United States drive to work on America's roads, but poor road infrastructure conditions cost Americans 100 billion dollars in wasted fuel and time every year. Maintaining such infrastructure is important, but the cost and time needed for human inspectors to identify defects and judge their severity can be prohibitive. In addition to the cost issue, a small number of human inspectors in some industries is an issue, with the rail industry for example, having a notable shortfall. However, infrastructure monitoring is necessary for effective infrastructure maintenance.

With a potential to cover many more miles of additional track in less time, the use of unmanned aerial vehicles (UAVs) to locate defects in the railway industry is currently being tested. In this case, once a UAV has found a possible defect, a human inspector can be sent to verify the defect. Similar testing is being done in many areas of infrastructure inspection, such as construction and pipeline inspection. However, current UAV platforms cannot geo-locate defects precisely enough or take images of sufficient clarity for this purpose.

Current UAV systems can provide geolocation to an accuracy of a few inches. However, this error margin is too large for some types of analysis, such as matching images of defects with historical image data. Furthermore, the images recorded by UAV systems are often of low quality or blurred, which makes matching and comparison of image data more problematic. For example, in the case of rail infrastructure analysis, smaller defects, such as cracks or missing bolts, may not visible, cannot be identified, or may not be located with sufficient precision. All of this makes it difficult to judge the necessity of human infrastructure inspections and repair to the rail through historic comparisons of image data acquired by UAV systems.

Several approaches to address the geolocation problems have been proposed. One approach includes an INS/GPS sensor fusion scheme, based on state-dependent Riccati equation (SDRE) nonlinear filtering, for unmanned aerial vehicle (UAV) localization. This approach improves accuracy, but not to the level needed. In addition, georeferenced point clouds captured at the height of 50 meters can be accurate to 25-40 mm, which is similar to RTK technology widely in use.

Several patents and patent applications describe attempts to resolve the geolocation problem. For example U.S. Patent Application Publication No. 2017/0041763 describes an automated method of determining the location of an aerial vehicle which uses an aerial platform network. U.S. Pat. No. 9,786,165 describes a system to provide location positioning for locating a transportation apparatus through a UAV network. U.S. Pat. No. 9,678,507 discusses autonomous infrastructure element survey systems and methods using UAV fleet deployment, which differs considerably as it employs a fleet of UAVs and is not concerned with the precision of location accuracy. U.S. Pat. No. 9,740,200 describes an unmanned aerial vehicle inspection system, in which a UAV flies from one location to another based on information provided by an operator's device.

However, the accuracy provided by these approaches remains insufficient for many monitoring applications. Additionally, many of these approaches do not address infrastructure monitoring, let alone provide an approach to providing an effective solution for such monitoring.

SUMMARY OF THE INVENTION

The inventors recognize that use of commercial drones for monitoring is significantly limited, particularly with respect to location accuracy and image quality. As a result, effective use of commercial drones to determine if infrastructure is sound or defective is not possible.

Embodiments described herein provide a management solution that uses an unmanned mobile observation device to acquire observation data, which includes highly accurate geolocation data and corresponding image/sensor data, of improvement(s). The observation data allows for comparison of image/sensor data acquired over time to determine whether defects, including defects with very small visual footprints, are present or follow up action(s) are otherwise necessary.

In a more particular embodiment, the unmanned mobile observation device is an unmanned aerial vehicle which acquires image/sensor data and determines highly accurate location data, which are collectively stored as observation data. The unmanned mobile observation device can be capable of reliably and repeatedly acquiring observation data from precise locations. The observation data can be evaluated to identify changes and/or defects over time.

In an illustrative application, an unmanned mobile observation device is used to acquire observation data for a railroad, such as the railroad track, track structure, etc. The observation data can be evaluated by a human and/or using data analytics to identify the presence of and location of various defects that may be present. For example, the evaluation can indicate that a railroad track has bent since observation data was previously acquired for the same location.

When a defect/possible defect is identified, the observation data can be used to enable an inspector to locate the defect for in person inspection/verification, a maintenance person to perform maintenance at the location, follow up imaging to be performed, which can include closer imaging using an unmanned mobile observation device, and/or the like. High quality image data can also enable identification of infrastructure defects that have a small visual signature, such as a fraction of an inch.

Aspects of the invention provide an unmanned mobile observation device, such as an unmanned aerial vehicle, which can be used to acquire observation data for a sensitive area. The observation data can include image data and geolocation data corresponding to a real-world geographic location at which the image data was acquired. The geolocation data can be accurate to five centimeters or less. The observation data can be evaluated to identify any defects within the sensitive area. Such evaluation can include comparison with previously acquired image data for the sensitive area, which can be enables by using the geolocation data to select the corresponding previously acquired image data.

A first aspect of the invention provides a system comprising: an unmanned mobile observation device, the unmanned mobile monitoring device including: an imaging component configured to acquire image data of an improvement being monitored; a navigation component configured to navigate the unmanned mobile observation device to an image acquisition geographic location suitable for acquiring the image data of the improvement being monitored; and a geolocation component configured to determine a real-world geographic location of the unmanned mobile observation device to an accuracy of five centimeters or less when the imaging component acquires the image data, wherein geolocation data corresponding to the real-world geographic location is stored with image data acquired by the imaging component as observation data for the improvement being monitored.

A second aspect of the invention provides an unmanned aerial vehicle, including: an imaging component configured to acquire image data of an area being monitored, wherein the imaging component includes: an imaging device configured to acquire image data of the area; and a deblurring component configured to remove distortion from the image data acquired by the imaging device using inertial data of the unmanned aerial vehicle synchronized with the image data acquisition by the imaging device; a navigation component configured to navigate the unmanned aerial vehicle to an image acquisition geographic location suitable for acquiring the image data of the area being monitored; and a geolocation component configured to determine a real-world geographic location of the unmanned aerial vehicle to an accuracy of five centimeters or less when the imaging component acquires the image data, wherein geolocation data corresponding to the real-world geographic location is stored with image data acquired by the imaging component as observation data for the area being monitored.

A third aspect of the invention provides a system for managing a sensitive area, the system comprising: an unmanned aerial vehicle, including: an imaging component configured to acquire image data of an area being monitored, wherein the imaging component includes: an imaging device configured to acquire image data of the area; and a deblurring component configured to remove distortion from the image data acquired by the imaging device using inertial data of the unmanned aerial vehicle synchronized with the image data acquisition by the imaging device; a navigation component configured to navigate the unmanned aerial vehicle to an image acquisition geographic location suitable for acquiring the image data of the area being monitored; a geolocation component configured to determine a real-world geographic location of the unmanned aerial vehicle to an accuracy of one centimeter or less when the imaging component acquires the image data, wherein geolocation data corresponding to the real-world geographic location is stored with image data acquired by the imaging component as observation data for the area being monitored; and a monitoring component configured to compare the image data to previously acquired image data using the geolocation data for the image data and the previously acquired image data and generate defect data for each defect found as a result of the image data comparison; and a sensitive area management system that schedules personnel based on the defect data.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an unmanned mobile observation device, such as an unmanned aerial vehicle, which can be used to acquire observation data for a sensitive area. The observation data can include image data and geolocation data corresponding to a real-world geographic location at which the image data was acquired. The geolocation data can be accurate to five centimeters or less. The observation data can be evaluated to identify any defects within the sensitive area. Such evaluation can include comparison with previously acquired image data for the sensitive area, which can be enables by using the geolocation data to select the corresponding previously acquired image data.

As used herein, "image" refers to any two-dimensional representation of an area, without regard to how the two-dimensional representation is generated. To this extent, an image can be generated based on any type of electromagnetic radiation, such as ultraviolet, visible, infrared, and/or the like. Furthermore, an image can be generated using a two-dimensional sensor array or a one-dimensional sensor array that scans the area. Still further, an image can be generated using other types of non-electromagnetic solutions, such as echolocation. Image data refers to any type of digital representation of the image.

Figure 1:
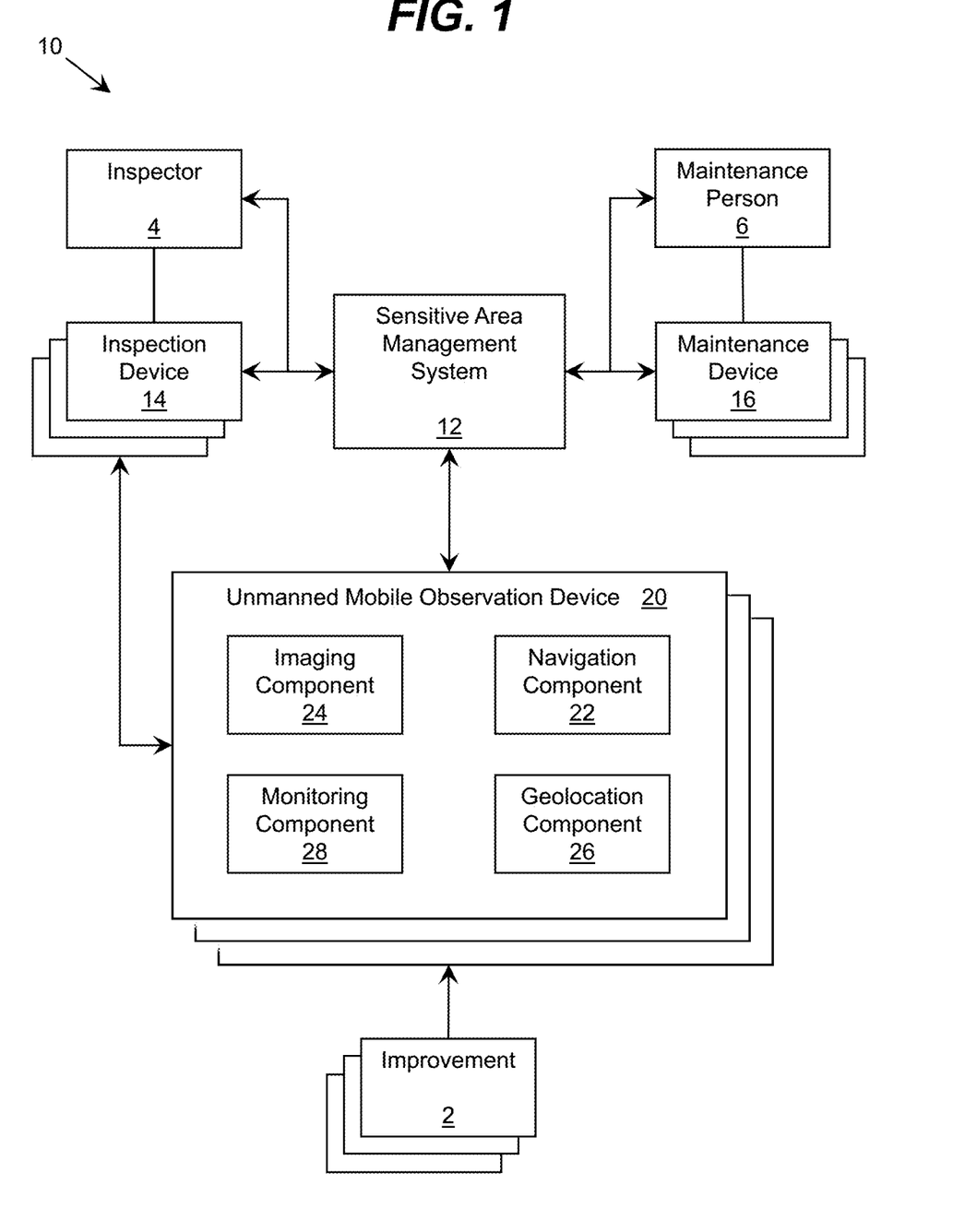
FIG. 1 shows an illustrative environment for managing a sensitive area according to an embodiment.

Turning to the drawings, FIG. 1 shows an illustrative environment 10 for managing a sensitive area according to an embodiment. In general, the sensitive area can include one or more improvements 2. However, it is understood that in certain applications described herein, the sensitive area may not include any improvements 2. As used herein, an improvement 2 includes any modification to a geographic area that is subject to wear from use, need for maintenance, monitoring for damage, and/or monitoring for changes. Illustrative improvements include structures, such as railroads, roads (paved or unpaved), overpasses, bridges, dams, buildings, pipeline, utility poles, wiring and cables, sewers, fencing, walls, gates, etc. Additionally, improvements include paths (e.g., trails), which may be paved or unpaved, permanent or seasonal, etc. An improvement can be completed and ready for use or in use, or can be under construction.

The environment 10 is shown including a sensitive area management system 12, which can be configured to manage the use of various devices in managing the sensitive area and the improvement(s) 2 located therein. For example, the sensitive area management system 12 can manage deployment and/or operation of one or more inspection devices 14, which can be used to acquire data regarding the improvement(s) 2 and determine whether any maintenance or repairs are required. The inspection devices 14 can include, for example, a handheld inspection device which is operated by a human inspector 4, an automated or semi-automated device that can be permanently or temporarily located to monitor the improvement(s) 2, and/or the like. In addition to the inspection devices 14, the sensitive area management system 12 can manage scheduling and/or deployment of human inspectors 4, who can visually inspect an improvement 2, operate an inspection device 14 to inspect the improvement(s) 2, and/or the like.

Similarly, the sensitive area management system 12 can manage deployment and/or operation of one or more maintenance devices 16, which can be used to maintain, repair, etc., the improvement(s) 2. The maintenance devices 16 can include, for example, a manually operated maintenance device which is operated by a human maintenance person 6, an automated or semi-automated device that can be permanently or temporarily located to maintain or repair the improvement(s) 2, and/or the like. In addition to the maintenance devices 16, the sensitive area management system 12 can manage scheduling and/or deployment of human maintenance personnel 6, who can maintain and/or repair improvement(s) 2, replace improvement(s) 2, operate a maintenance device 16 to maintain, repair, and/or replace the improvement(s) 2, and/or the like. While a maintenance person 6 and maintenance device 16 are shown and described herein, it is understood that the environment 10 can include personnel and/or devices that are constructing one or more improvements 2, such as adding an improvement to the area, etc. As part of managing the maintenance devices 16 and maintenance personnel 6, the sensitive area management system 12 can manage ancillary tasks, such as ordering any necessary parts, tracking wear to predict maintenance, etc.

To reduce the workload of the inspectors 4 and/or maintenance personnel 6, and/or provide additional functionality as described herein, the sensitive area management system 12 can further manage deployment and/or operation of one or more unmanned mobile observation devices 20. As used herein, an unmanned mobile observation device 20 is any type of unmanned vehicle capable of traveling over land, on or within water, and/or in air, and acquiring image data for use in monitoring one or more attributes of the area. To this extent, an unmanned mobile observation device 20 can comprise a wheeled or tracked vehicle, a boat/ship or submarine, or an aircraft. The unmanned mobile observation device 20 can utilize any type of propulsion solution, have any size, have any operational range, etc., which are suitable for use of the unmanned mobile observation device 20 in the corresponding environment of the sensitive area including the improvement(s) 2. In a more particular embodiment, the unmanned mobile observation device 20 is capable of autonomous travel, without control by a human or system operator. In an illustrative embodiment, the image data is generated from electromagnetic data. However, it is understood that image data generated using other solutions can be acquired.

As illustrated, the unmanned mobile observation device 20 can include various components, each of which provides functionality that enables the unmanned mobile observation device 20 to be used to effectively acquire observation data regarding improvement(s) 2 located within the sensitive area. For example, the unmanned mobile observation device 20 can include: a navigation component 22, which is configured to navigate the unmanned mobile observation device 20 to a desired location with respect to an improvement 2 to be observed; an imaging component 24, which is configured to acquire image data of the improvement 2; a geolocation component 26, which is configured to precisely identify a real-world geographic location of the unmanned mobile observation device 20 when the imaging component 24 acquires the image data; and a monitoring component 28, which enables the unmanned mobile observation device 20 to execute a monitoring process in an autonomous or semi-autonomous manner. Further details and illustrative attributes of the unmanned mobile observation device 20 and the corresponding components 22, 24, 26, 28 are described herein. However, it is understood that this description is not intended to limit the unmanned mobile observation device 20 to the precise embodiments shown and described, but is intended to illustrate various features of an unmanned mobile observation device described herein.

Figure 2:
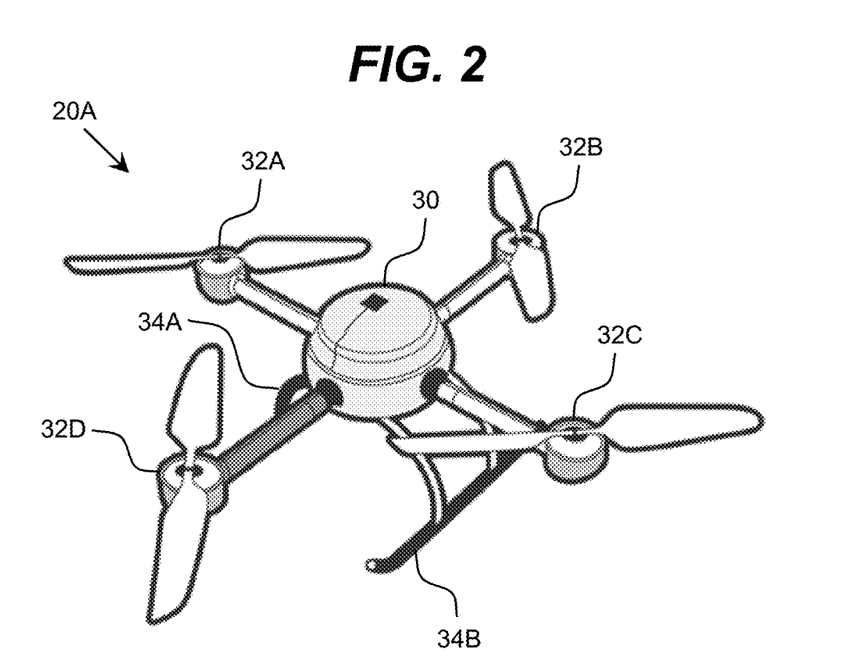
FIG. 2 shows an illustrative unmanned aerial vehicle according to an embodiment.

In a more particular illustrative embodiment, the unmanned mobile observation device 20 is an unmanned aerial vehicle (UAV). To this extent, FIG. 2 shows an illustrative UAV 20A according to an embodiment. As illustrated, the UAV 20A includes a main body 30, which is lifted into flight by a propulsion system including four propellers 32A-32D. The propulsion system can be powered using any type of engine or motor, which can use any type of power source(s), such as a fuel, batteries, etc. Additionally, the UAV 20A includes a pair of skids 34A, 34B, which enable the UAV 20A to be landed without damaging the main body 30 and the corresponding components located therein. It is understood that the configuration of UAV 20A is only illustrative of various possible configurations of UAVs possible for use in embodiments of unmanned mobile observation devices described herein.

Figure 3:
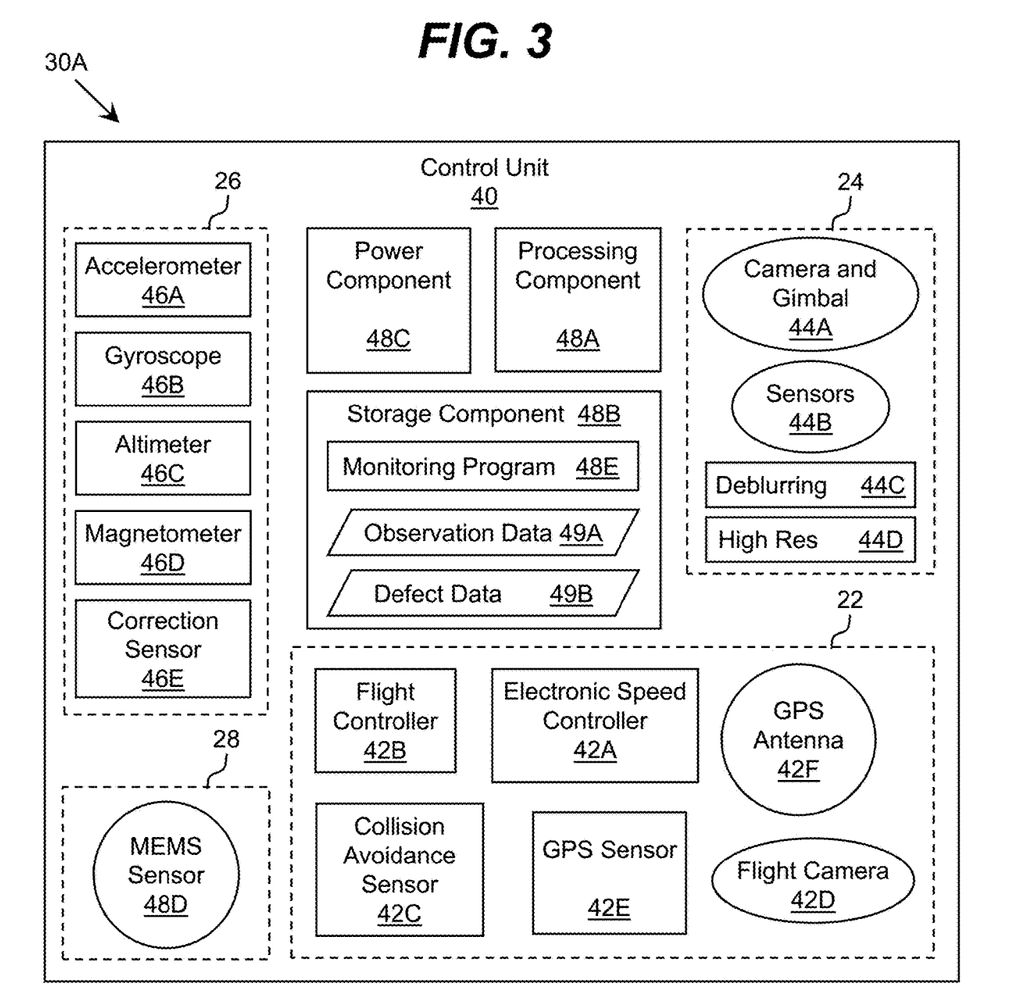
FIG. 3 shows an illustrative conceptual structure of a main body of an unmanned mobile observation device according to an embodiment.

FIG. 3 shows an illustrative conceptual structure of a main body 30A of an unmanned mobile observation device 20 (FIG. 1) according to an embodiment. In general, the main body 30A can house a control unit 40, which comprises various devices for safely navigating the unmanned mobile observation device 20 and acquiring observation data, which can be used in evaluating an improvement 2 (FIG. 1) as described herein. In general, the control unit 40 can comprise a processing component 48A, a storage component 48B, and a power component 48C, which provide functionality to one or more of the other components included in the control unit 40.

For example, the processing component 48A can include one or more general purpose and/or single purpose (application specific) processors, each of which is configured to process data according to instructions (e.g., as defined by circuitry, program code, such as a monitoring program 48E, executed by a processor, a field-programmable gate array, and/or the like), which can result in the processing component 48A obtaining data from the storage component 48B and/or another component, providing transformed data to the storage component 48B and/or another component, etc. To this extent, the processing component 48A can include one or more processors used by multiple components described herein and/or one or more processors used only by a single component described herein. A processor can be used to perform the same processing task and/or be used to perform different processing tasks (e.g., by executing different program code) by one or more of the components described herein.

The storage component 48B can include, for example, a storage hierarchy, which includes multiple types of data storage solutions. For example, the storage component 48B can include random access memory (RAM), flash memory, disk storage (e.g., solid-state, magnetic, optical, and/or the like), etc. In an embodiment, the storage component 48B includes sufficient disk storage space to store all observation data 49A acquired of improvement(s) 2 while performing a monitoring task described herein. Alternatively, the storage component 48B can store only a portion of the observation data 49A, and the control unit 40 can be configured to transmit observation data 49A and/or data derived therefrom, such as defect data 49B, to another computer system located apart from the unmanned mobile observation device 20 while performing a monitoring task described herein.

The power component 48C can comprise, for example, a set of batteries, which are configured to provide sufficient power to operate all components of the control unit 40 for a sufficient time to perform a monitoring task described herein. Additionally, the power component 48C can include one or more devices configured to recharge the battery during use of the unmanned mobile observation device 20, e.g., using electricity generated during operation of the unmanned mobile observation device 20 (e.g., by an alternator), generating electricity from an ambient operating condition (e.g., solar cells), etc.

As discussed herein, the control unit 40 of the unmanned mobile observation device 20 can include a navigation component 22, which enables the unmanned mobile observation device 20 to move within its operating area to a target location, e.g., to observe an improvement 2. Using the UAV 20A (FIG. 2) as an illustrative unmanned mobile observation device 20, the navigation component 22 can include: an electronic speed controller 42A, a flight controller 42B, a collision avoidance sensor 42C, a flight camera 42D, a global positioning system (GPS) sensor 42E, and a GPS antenna 42F.

During operation of the navigation component 22, the electronic speed controller 42A can control the propulsion system (e.g., the propellers 32A-32D shown in FIG. 2) to control the speed at which the unmanned mobile observation device 20 is moving. The flight controller 42B can operate in tandem with the collision avoidance sensor 42C to adjust the speed and/or direction of travel of the unmanned mobile observation device 20 in order to safely navigate within the operating environment.

The flight controller 42B can further acquire and process data (e.g., using the processing component 48A) from a flight camera 42D and/or a GPS sensor 42E in order to navigate to a particular location. For example, the GPS sensor 42E can process GPS signal data acquired by the GPS antenna 42F to determine a location of the unmanned mobile observation device 20. While a GPS sensor 42E and GPS antenna 42F are shown, it is understood that this is only illustrative of the global navigation satellite systems (GNSS) which can be utilized in embodiments described herein. The flight camera 42D can acquire image data of the operating environment to identify known features and/or the location of obstacles to be avoided. Additionally, the flight camera 42D can acquire image data that can be transmitted to an external navigation system, which is used by a human operator to monitor the movement of the unmanned mobile observation device 20 and/or navigate the unmanned mobile observation device 20 during a manual navigation mode.

The control unit 40 of the unmanned mobile observation device 20 also can include an imaging component 24, which is configured to acquire image data of the improvement 2. For example, the imaging component 24 is shown including a camera and gimbal 44A. The gimbal can mount the camera to the main body 30A and can enable the camera to be rotated about one or more axes. The camera can comprise any type of imaging device that acquires image data of a sufficient quality to enable analysis of the improvement 2 as described herein. For example, for many applications, a 100 mega pixel camera resolution can be utilized. However, it is understood that higher or lower resolutions can be suitable for use in various applications. In an embodiment, the camera is a visible light-based imaging device. However, it is understood that the imaging component 24 can include one or more sensors 44B that generate image data from other spectra, such as ultraviolet, infrared, multiple spectra, etc. Furthermore, the imaging component 24 can include a sensor 44B that generates image data from another sensing approach, such as using three-dimensional scanning (e.g., a structured light 3D scanner), light detection and ranging (LIDAR), radar, sonar, and/or the like.

The imaging component 24 also can include one or more components configured to improve a quality of the image data. For example, the imaging component 24 can include a deblurring component 44C, which can be configured to remove distortion from the image data. Additionally, the imaging component 24 can include a high resolution (high res) component 44D, which can be configured to generate image data having a higher resolution than the raw image data by combining two or more images of an area. In an embodiment, one or both of the deblurring component 44C and the high resolution component 44D is implemented as program code executed by the processing component 48A.

Furthermore, the control unit 40 is shown including a geolocation component 26, which is configured to precisely determine a real-world geographic location of the unmanned mobile observation device 20. To this extent, the geolocation component 26 includes various sensors which provide data which can be used to further refine the accuracy of the location of the unmanned mobile observation device 20 as determined from the GPS data. Additionally, the geolocation component 26 can acquire data used to provide positioning for a period of time when GPS data may not be available. For example, the geolocation component 26 is shown including: an accelerometer 46A, which can acquire proper acceleration data for the unmanned mobile observation device 20; a gyroscope 46B, which can acquire data regarding orientation and angular velocity of unmanned mobile observation device 20; an altimeter 46C, which can acquire data corresponding to an altitude of the unmanned mobile observation device 20; and a magnetometer 46D, which can acquire data regarding a magnetic field, such as the ambient magnetic field within which the unmanned mobile observation device 20 is located. In an embodiment, the various sensors 46A-46D are implemented in an inertial management unit (IMU). However, it is understood that the particular implementation and combination of sensors 46A-46D is only illustrative of various sensor configurations that can be utilized. Additionally, the geolocation component 26 can include a ground-based correction sensor 46E, which can receive location signals from a nearby ground-based location.

The control unit 40 also can include a monitoring component 28, which enables the unmanned mobile observation device 20 to execute a monitoring process in an autonomous or semi-autonomous manner. As part of executing a monitoring process, the control unit 40 may receive and process, e.g., as defined by the monitoring program 48E, a route which defines the location(s) to which the unmanned mobile observation device 20 should navigate and acquire observation data 49A of a sensitive area, e.g., one or more improvements located therein. Data defining such a route can be stored in the storage component 48B and processed by the processing component 48A to direct the navigation component 22 to autonomously navigate to the corresponding location(s) on the route and acquire observation data 49A of the improvement(s) 2.

Additionally, the control unit 40 can include one or more micro electro-mechanical systems (MEMS) sensors 48D as part of the monitoring component 28. In an embodiment, the MEMS sensors 48D can include one or more accelerometers, one or more gyroscopes, and/or the like. However, it is understood that these sensors are only illustrative. As described herein, image data acquired by the imaging component 24 may require further processing to be suitable for data analysis defines as part of the monitoring process. The MEMS sensor 48D can acquire data that can be used to deblur and/or enhance the raw image data acquired by the imaging component 24. The data acquired by the MEMS sensor 48D can be stored as observation data 49A in the storage component 48D and/or processed by the processing component 48A to refine the raw image data for further analysis.

While not shown in FIG. 3, it is understood that an unmanned mobile observation device 20, e.g., the main body and/or control unit thereof, can include one or more additional components that enable wireless communications with one or more external systems. To this extent, the control unit 40 can further include one or more transceivers and/or corresponding antennae that enable the unmanned mobile observation device 20 to communicate with an external system using any wireless communications solution. Illustrative wireless communications solutions include a wireless radio link (e.g., direct or indirect), communications using a cellular network (which can utilized a public telephone network), satellite communications, and/or the like. Additionally, the control unit 40 can include one or more communications devices for communicating over a wired communications link, e.g., to transfer data from the unmanned mobile observation device 20 after returning from acquiring observation data for improvement(s) 2. To this extent, it is understood that many modifications and variations of the components described herein can be implemented in embodiments of an unmanned mobile observation device 20 described herein.

As described herein, an embodiment of the unmanned mobile observation device 20 can include precise geolocation information in the observation data 49A corresponding to a location at which image data of an improvement 2 was acquired by the imaging component 24 (e.g., by an imaging device or other sensor). Furthermore, the unmanned mobile observation device 20 can include precise geolocation data in the observation data 49A for image data of the improvement 2 acquired at different times, e.g., during different traversals of a monitoring route. Inclusion of precise geolocation data for the image data can enable consistent utilization of the observation data 49A for comparisons of attributes of the improvement 2 at different times as part of monitoring the improvement 2 for required maintenance, repair, replacement, and/or the like.

Figure 4:
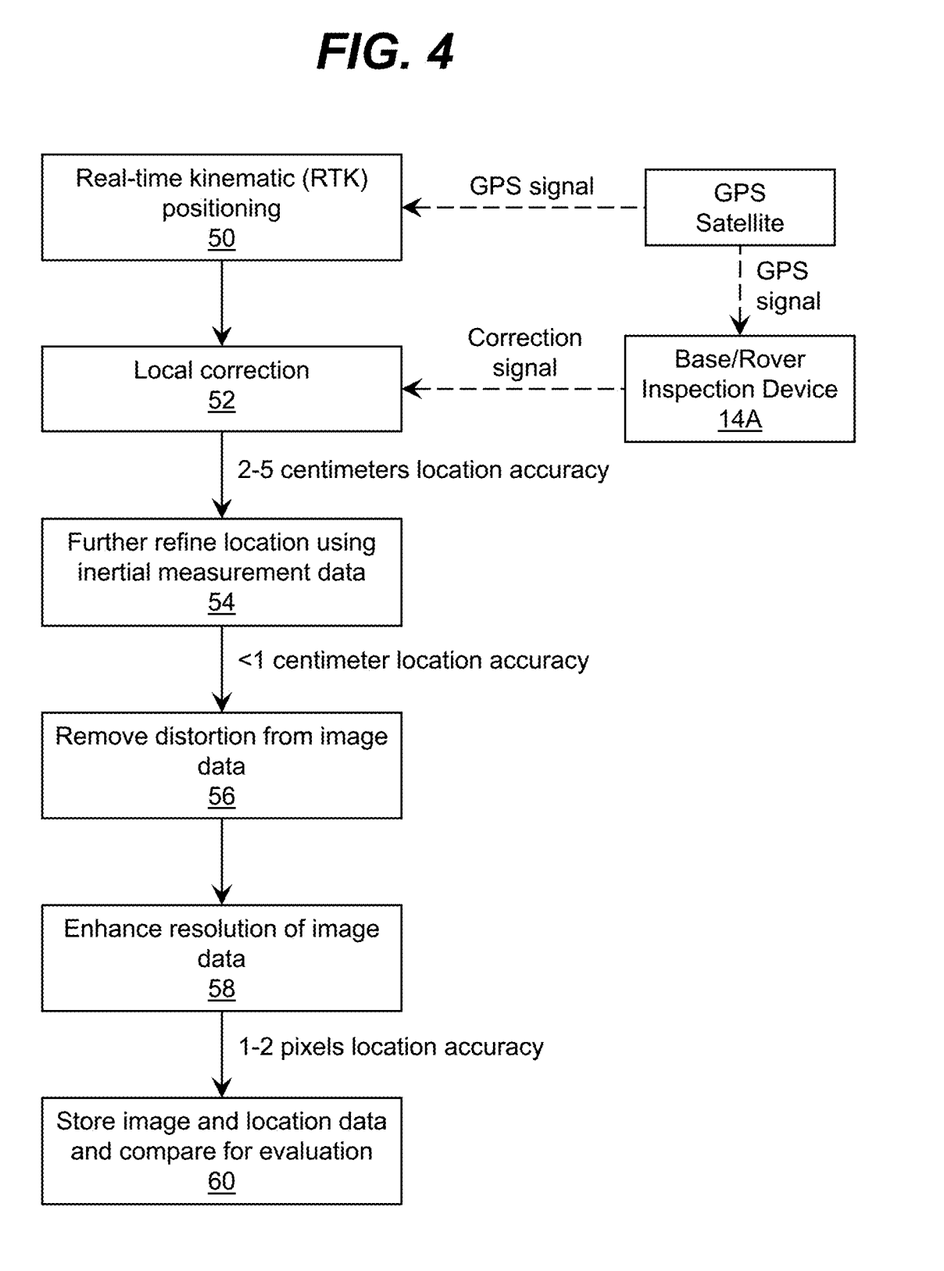
FIG. 4 shows an illustrative processing diagram for generating location and image data for use in monitoring an improvement according to an embodiment.

FIG. 4 shows an illustrative processing diagram for generating location and image data for use in monitoring an improvement according to an embodiment. The process can be performed on the unmanned mobile observation device 20 (FIG. 1) and/or portions of the process can be performed by another system other than the unmanned mobile observation device 20, such as the sensitive area management system 12 (FIG. 1), an inspection device 14 (FIG. 1), and/or the like. In an embodiment, at least a portion of the actions included in the process are defined by the monitoring program 48E (FIG. 3), which is executed by the processing component 48A (FIG. 3) to perform the actions described herein. As an illustrative embodiment, the process is described as being entirely performed by the unmanned mobile observation device 20. However, it is understood that this is only illustrative and at least some of the image processing, location refinement, and/or image analysis described herein can be performed and/or replicated by another system, such as the sensitive area management system 12 (FIG. 1), using the image and location data acquired by the unmanned mobile observation device 20.

In action 50, the processing component 48A can receive GPS signal data from a GPS satellite, which was acquired by the GPS sensor 42E (FIG. 3) using any of various GPS modes, such as a differential GPS mode. The processing component 48A can perform real-time kinematic (RTK) positioning using measurements of the phase of the GPS signal's carrier wave to improve an accuracy of the GPS position data. The accuracy of current RTK is limited by distance dependent errors from orbit, ionosphere, and troposphere, as well as other local effects.

To further improve the accuracy of the position data, in action 52, the processing component 48A can process correction signal data received by a correction sensor 46E (FIG. 3) from an inspection device 14A. The correction signal data can include data regarding coordinates and a correction. The inspection device 14A can comprise a fixed or mobile inspection device 14A, which can very quickly acquire GPS signals, compute corrections, and transmit the corrections to the nearby unmanned mobile observation device 20. In an embodiment, the unmanned mobile observation device 20 can be located up to approximately twenty kilometers (12.4 miles) from the inspection device 14A. The processing component 48A can use the correction signal data to mitigate spatial correlation errors and speed up the process of resolving ambiguity in precise positioning. This combination of RTK positioning with correction can achieve geolocation accuracy of 2-5 centimeters (approximately 0.8 to 1.9 inches). While a single inspection device 14A is shown providing a correction signal, it is understood that an unmanned mobile observation device 20 can receive and process correction signal data from any number of one or more inspection devices 14A, which can include any combination of fixed and/or mobile inspection devices 14A. In an embodiment, the inspection device 14A comprises a vehicle.

In action 54, the processing component 48A can further improve an accuracy of the location data using inertial measurement data acquired by the geolocation component 26 (FIG. 3). The inertial measurement data can comprise a combination of sensor data acquired by multiple types of sensors, such as some or all of the sensors described in conjunction with the geolocation component 26 shown in FIG. 3, which the processing component 48A can use to further refine an accuracy of the location data to attain the most reliable and precise location data available. Additionally, the processing component 48A can use the inertial measurement data to provide location guidance when GPS signal data is not available. By using a combination of the RTK positioning with correction and inertial measurement data, the processing component 48A can determine a location to an accuracy of less than 1 centimeter (e.g., approximately 0.4 inches).

The processing component 48A also can improve quality of the image data acquired by the imaging component 24 (FIG. 1). For example, in many situations, the acquired image data can include distortion (e.g., blur) due to motion of the unmanned mobile observation device 20 during acquisition of the image data. In an embodiment, an imaging device can implement image stabilization and vibration reduction techniques that consumer cameras implement eliminate many camera shake effects. For example, dual axis rate sensors in the imaging device can measure camera pitch and yaw and actuators can drive an optical element to keep the image motionless on the imaging device. However, as imagery acquired by a UAV is most affected by roll and pitch of the airframe relative to the desired flight path, steered optical correction of roll is not as straightforward as pitch and yaw correction.

To this extent, in action 56, the processing component 48A can remove distortion from the image data (e.g., as directed by the deblurring component 44C). In an embodiment, the processing component 48A removes distortion using data regarding a motion trajectory, such as a point spread function (PSF), of the imaging device (e.g., the camera) relative to the object space during the acquisition time of the image data. If the PSF is perfectly known for an image, the intra-frame motion blur can be completely removed, less the high frequency information permanently lost.

In an embodiment, the processing component 48A can implement a distortion removal technique that uses synchronized inertial data to develop a PSF that is used to remove distortion from the image data using a set of deconvolution solutions. For example, the MEMS sensor 48D (FIG. 3) can acquire data regarding roll and pitch of the unmanned mobile observation device 20 at a sampling rate of approximately 200 Hertz. For an imaging device that generates images at up to 30 frames per second, a frame time will be approximately 33 milliseconds. As a result, the MEMS sensor 48D will acquire about seven discrete measurements of the roll and pitch angular rates during the frame time. However, it is understood that the sampling and imaging rates are only illustrative.

Figure 5:
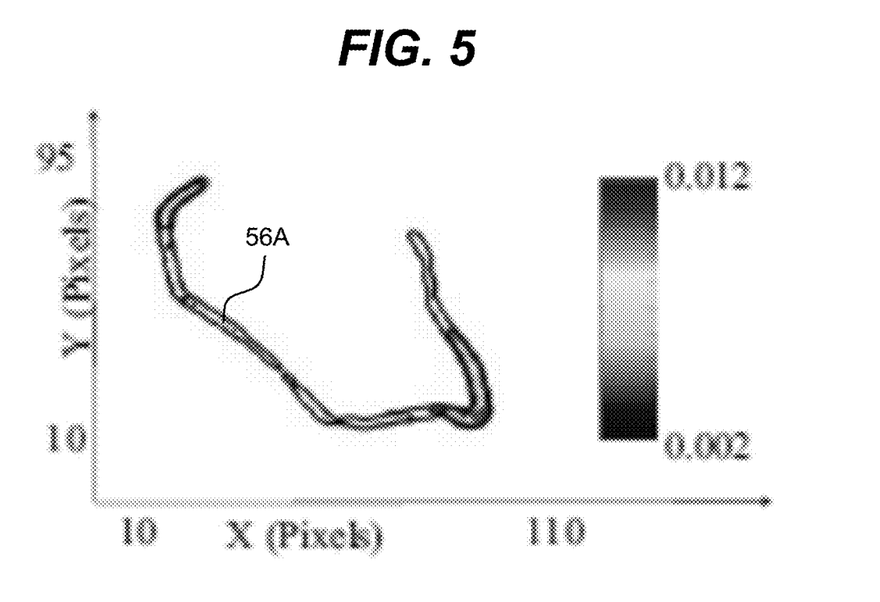
FIG. 5 shows an illustrative point spread function, which can be used to remove distortion in the corresponding image data.

From the discrete measurements of the roll and pitch, the processing component 48A can generate a PSF for an image. To this extent, FIG. 5 shows an illustrative point spread function 56A, which can be used to remove distortion in the corresponding image data. As illustrated, the discrete measurements are converted into a continuous PSF 56A. The PSF 56A shows a large circular blur that is difficult to deblur using conventional methods. Distortion removal can use the fact that energy is conserved in the blurring process. As a result, the total incident radiation in the image data acquired during the frame time is the same in a blurred image as it would be if there were no blur. Using this fact as well as the PSF 56A enables the processing component 48A to remove the majority of the motion-based blur from the image.

Figure 6:
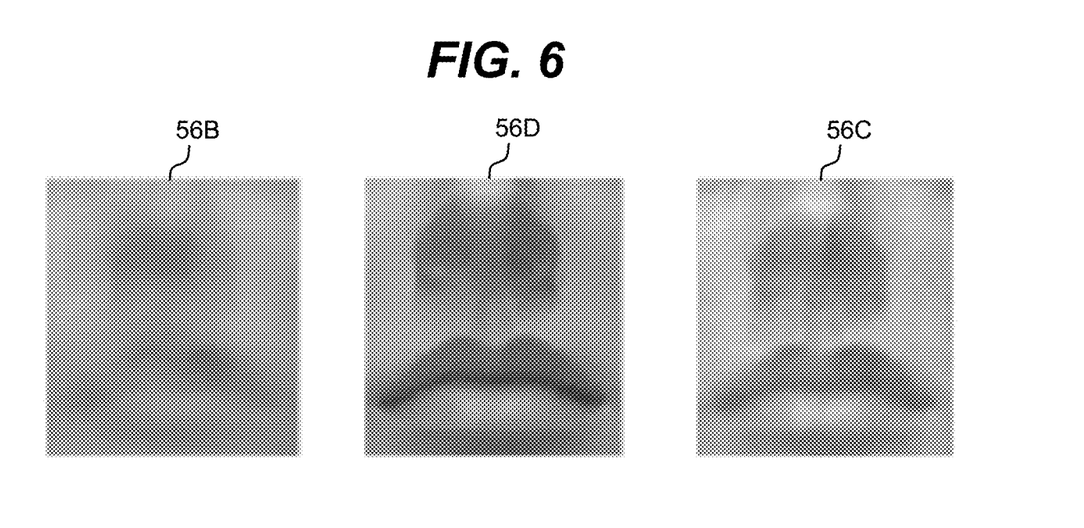
FIG. 6 shows illustrative images illustrating distortion removal using the point spread function of FIG. 5.

FIG. 6 shows illustrative images 56B-56D illustrating distortion removal using the PSF 56A of FIG. 5. In particular, image 56B comprises a raw image that includes distortion due to the circular motion that occurred during the frame time as estimated by the PSF 56A. Image 56C corresponds to the raw image after distortion has been removed using the PSF 56A, which can be generated as described herein. Image 56D is an image that does not include any distortion. As illustrated by the image 56C, numerous features of the image are enhanced as a result of the distortion removal process described herein.

Returning to FIG. 4, in action 58, the processing component 48A can enhance a resolution of image data acquired of an improvement 2 using any solution. For example, the processing component 48A can use a super-resolution process to develop a set of higher resolution images from lower resolution images. In this process, the processing component 48A can create one upsized image of improved resolution using information from several different images. For example, resolution of the upsized image can be increased from that of the lower resolution images by the square root of the number of usable lower resolution images used. To this extent, by using the information of two lower resolution images, the resolution can be increased by approximately forty percent.

An increase in resolution can be beneficial for numerous reasons. For example, in infrastructure image recording operations, the higher resolution image data can be used to identify the presence or absence of potential issues having a smaller visual footprint, such as identifying missing bolts on railway lines, examining rail cross tie conditions or skew, examining gas pipelines for faults, etc. Using a process described herein, as well as common image processing algorithms, such as validation, the processing component 48A can create high resolution reference images of an improvement 2. This process can further improve resolution of features to the 3 to 5 pixel level or lower. In an embodiment, the process enables images (e.g., previously acquired and newly acquired high resolution reference images) to be accurately aligned within 1-2 pixels of the image data for comparison. As a result, comparison of the respective images can identify changes (e.g., defects) that result in only minor differences in the image data.

In action 60, the processing component 48A can store the geolocation and image data as observation data 49A (FIG. 3) in the storage component 48B (FIG. 3) for later retrieval using any data storage structure, such as a database. Additionally, the processing component 48A can compare image data, e.g., such as image data of the same improvement 2 acquired at different times, to identify any features that may have moved, are missing, have changed, and/or the like. As part of the image comparison, the processing component 48A can implement any of various image processing algorithms to compare new images or data to historic images or data.

To this extent, illustrative image processing algorithms include: image subtraction; image cross correlation; image feature recognition (e.g., tie plate bolt hole patterns or ballast quality feature recognition by using histogram of gradient, Harr wavelet, Tensor flow, SIFT, or deep learning); and/or any other image processing algorithms which will provide the required output relevant in each case. The processing component 48A can identify the desired results from the observation data 49A through the image processing and analytics, e.g., through smart registration of images, validation rules, image processing enhancement and differentials, and/or the like. Due to significant improvement in geolocation and image processing down to a pixel level resolution, the combined output from the processing component 48A can quickly and efficiently identify and log defects that result in visible changes to the appearance of the improvement 2. The processing component 48A can store the results of the analysis as defect data 49B, which can include identification of a defect found and/or operating status of an improvement 2, as well as the associated geolocation information associated with the defect.

As described herein, the unmanned mobile observation device 20 can be utilized to acquire observation data and/or monitor various types of improvements. In a more particular embodiment, the unmanned mobile observation device 20 described herein can be utilized to monitor a condition of infrastructure, such as an improvement relating to transportation, communication systems, power, water, sewage, and/or the like.

Figure 7:
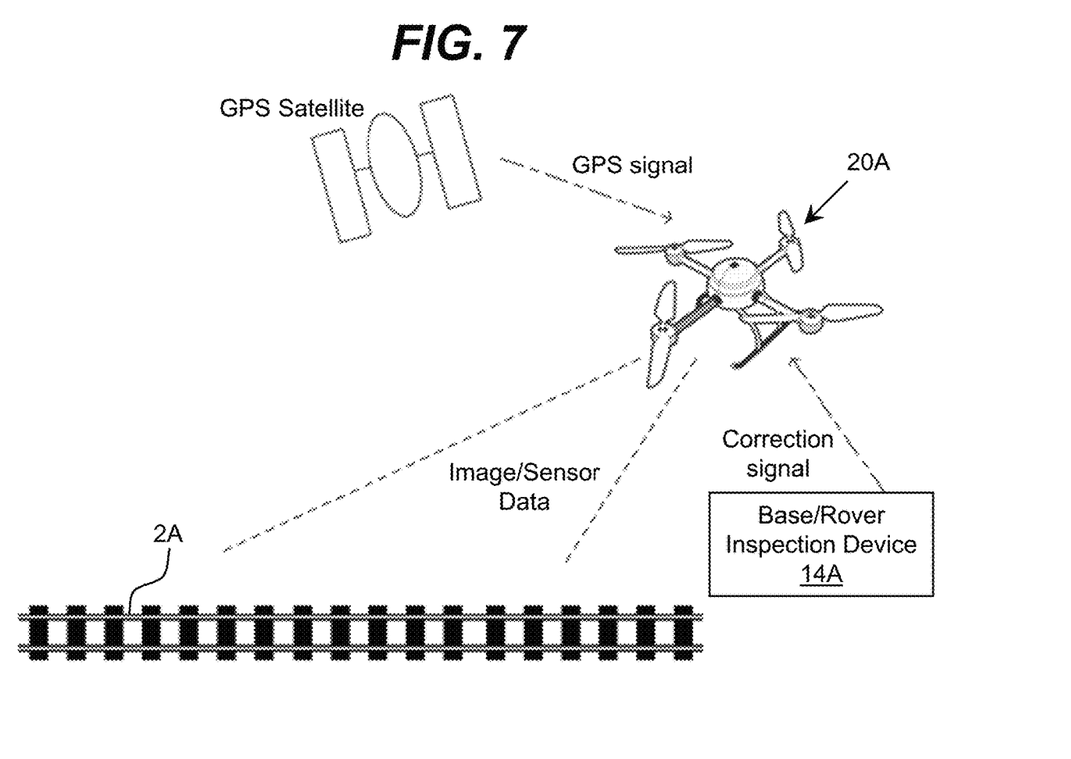
FIG. 7 shows an illustrative unmanned aerial vehicle being used to monitor a railroad according to an embodiment.

To this extent, FIG. 7 shows an illustrative unmanned mobile observation device, such as the UAV 20A shown in FIG. 2, being used to monitor a railroad 2A according to an embodiment. As described herein, the UAV 20A can use GPS signals received from a GPS satellite and/or correction signals received from an inspection device 14A to determine a geographic location of the UAV 20A with a high degree of accuracy. When properly positioned, the UAV 20A can acquire image/sensor data regarding the railroad 2A, which can be processed as described herein in order to determine whether the railroad 2A is in need of any maintenance, further inspection, and/or the like.

Figure 8:
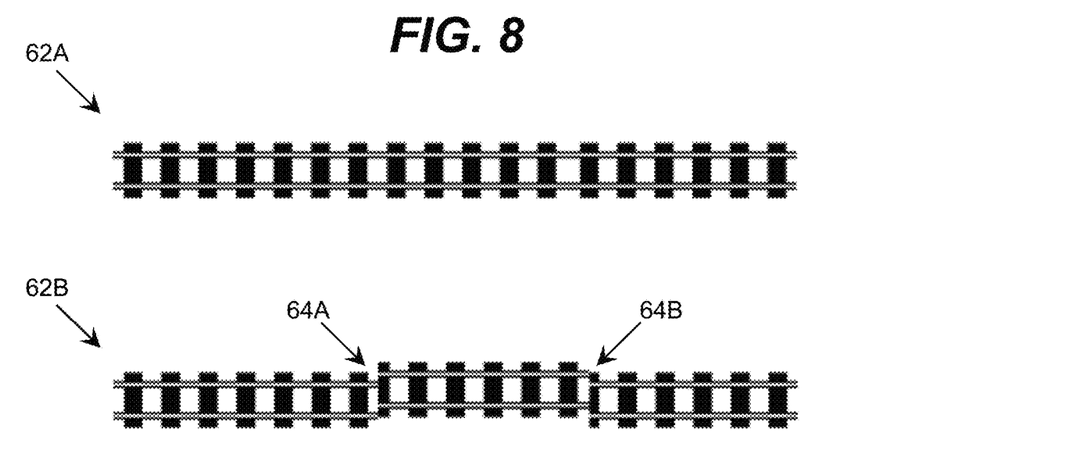
FIG. 8 shows illustrative images of a railroad acquired at different times.

The UAV 20A can store the image/sensor data with the location data as observation data 49A (FIG. 4) to enable later access and use, e.g., to compare differences in the railroad over time. For example, FIG. 8 shows illustrative images 62A, 62B of a railroad 2A acquired at different times. The UAV 20A can use the geolocation data to select an historic image 62A for comparison with a newly acquired image 62B. Data regarding differences in the two images, as illustrated by possible defects 64A, 64B, can be stored as defect data 49B for follow up. The defect data 49B can include the image data, which can be annotated to highlight the difference(s), location data corresponding to the location at which the image was taken, identification of the defect, and/or the like. Such follow up can include deployment of a human inspector 4 and/or one or more inspection devices 14 for verification, deployment of a maintenance person 6 and/or one or more maintenance devices 16 for repair, removal of the railroad 2A from service, modification of the operating conditions for trains using the railroad 2A (e.g., a temporary slowing of the speed limit), and/or the like. For example, a rail inspector can be able to determine what changes have occurred and determine if rail structure defects, such as missing bolts, ballast problems, buckled rails, etc., are present.

As described herein, the unmanned mobile observation device, such as the UAV 20A, can be used to repeatedly acquire image/sensor data of an improvement for use in monitoring the improvement over time. While the unmanned mobile observation device can be manually navigated, the unmanned mobile observation device can be more accurately and repeatedly located when navigating autonomously. To this extent, the unmanned mobile observation device can be programmed to repeatedly follow a predetermined navigation (e.g., flight) path, a defined line, and/or the like, and acquire image data at the same location(s) along the path. Repeated use of the same path and/or image location(s) can further improve the results of comparisons with historic images/data as both sets of images would be acquired from the same path.

It is understood that other solutions for flight path planning can be utilized without deviating from the spirit of this invention. Such solutions include, but are not limited to: following a line such as a railway line, road, fence, wall, pipeline, etc.; following a programmed path around or inside of a structure, such as a building, house, bridge, and so on; and/or the like. It is understood that the use of any programmed flight path can provide the UAV a similar vantage point as that used historically from which to acquire image/sensor data for comparing to historic image/sensor data.

While managing a railroad is one possible application, it is understood that a system described herein can be used as part of managing any of various types of sensitive areas with improvement(s). For example, a UAV described herein can be used to perform other types of infrastructure inspections, e.g., to acquire observation data of any infrastructure, including but not limited to: highway bridges and overpasses (from above and/or below), buildings, roads, etc. By comparison with historic observation data, the system can determine when human inspection and/or repair is required.

Similar to railroad management and inspection, the UAV can be used to manage other types of "lines," such as the line of a pipeline, power wires, a road, fencing, etc., by following the line to check for possible defects which could be subsequently verified by a human inspector. Where heat may indicate a problem (e.g., leaks, overheating, etc.), the UAV can incorporate infrared imaging. Historic observation data can be used for comparison as described herein.

Apart from monitoring improvements, an unmanned mobile observation device described herein can be used to monitor an area, e.g., for security and/or safety purposes. For example, a UAV described herein can be used to monitor environmental areas for problems, including but not limited to: forest fires, avalanches, deforestation, volcanic activity, floods, erosion, sinkholes, landslides, changing coastlines, and so on. In this case, the UAV can repeatedly acquire observation data that can be compared with historic observation data for changes indicative of potential problems. Similarly, a UAV described herein can repeatedly acquire observation data of a landscape, such as a border area, and note any changes, which may indicate border crossings, broken walls, dangerous or criminal activities, illegal border crossings, intrusions, and so on. Such monitoring can be performed on security-related improvements, such as walls, fences, gates, etc., as well as sensitive buildings such as nuclear facilities or similar, and so on. Still further, an unmanned mobile observation device described herein can be used to periodically acquire observation data of a construction site, and through image comparison, determine the amount of progress made over time at the site.

Various applications can use non-aerial unmanned mobile observation devices, such as robots or underwater drones, which can include components similar to those described herein to geolocate and process images when performing infrastructure inspections, such as of underwater pipes, cables, etc., or by land-based autonomous vehicles for a wide variety of inspections.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
   an unmanned mobile observation device, the unmanned mobile monitoring device including:
   an imaging component configured to acquire image data of an improvement being monitored;
   a navigation component configured to determine a real-world geographic location of the unmanned mobile observation device and navigate the unmanned mobile observation device to an image acquisition geographic location suitable for acquiring the image data of the improvement being monitored; and
   a geolocation component configured to determine a real-world geographic location of the unmanned mobile observation device to an accuracy of five centimeters or less when the imaging component acquires the image data, wherein the geolocation component is configured to automatically refine an accuracy of the determined real-world geographic location using correction signal data acquired from a real-world geographic location signal source, and wherein geolocation data corresponding to the real-world geographic location is stored with image data acquired by the imaging component as observation data for the improvement being monitored.

2. The system of claim 1, wherein the image acquisition geographic location corresponds to a geographic location at which a previous image of the improvement was acquired.

3. The system of claim 1, wherein the unmanned mobile observation device is an unmanned aerial vehicle.

4. The system of claim 3, wherein the real-world geographic location includes an altitude of the unmanned mobile observation device.

5. The system of claim 1, wherein the navigation component includes a global navigation satellite system (GNSS) sensor configured to receive GNSS signals transmitted by GNSS satellites, and wherein the geolocation component includes a ground-based correction sensor configured to receive the correction signal data from a ground-based location, wherein the geolocation component determines the real-world geographic location of the unmanned mobile observation device to the accuracy of five centimeters or less using data regarding the GNSS signals received by the GNSS sensor and data regarding the correction signal data received by the ground-based correction sensor.

6. The system of claim 5, wherein the geolocation component further-includes an inertial management component, wherein the inertial management component uses data from a plurality of sensors to further refine the real-world geographic location to an accuracy of one centimeter or less.

7. The system of claim 1, wherein the imaging component includes:
   a visible imaging device configured to acquire image data based on visible light; and
   a deblurring component configured to remove distortion from the image data acquired by the visible imaging device.

8. The system of claim 7, wherein the deblurring component uses inertial data of the unmanned mobile observation device synchronized with the image data acquisition by the visible imaging device to generate a point spread function.

9. The system of claim 8, wherein a set of deconvolution solutions use the point spread function to remove the distortion.

10. The system of claim 8, wherein the inertial data comprises roll and pitch rate data acquired by a multi-axis sensor.

11. The system of claim 7, wherein the imaging component further includes a high resolution component configured to generate a high resolution image by combining a plurality of images acquired by the visible imaging device, wherein the high resolution image has a resolution at least forty percent higher than the resolution of the plurality of images acquired by the visible imaging device.

12. The system of claim 1, the unmanned mobile observation device further including a monitoring component configured to autonomously route the unmanned mobile observation device along a pre-determined route to acquire observation data for the improvement.

13. The system of claim 1, the unmanned mobile observation device further including a monitoring component configured to compare the image data to previously acquired image data using the geolocation data for the image data and the previously acquired image data and generate defect data for each defect found as a result of the image data comparison.

14. The system of claim 13, further comprising a sensitive area management system that schedules at least one of: a set of inspectors or a set of maintenance personnel based on the defect data.

15. An unmanned aerial vehicle, including:
   an imaging component configured to acquire image data of an area being monitored, wherein the imaging component includes:
   an imaging device configured to acquire image data of the area; and
   a deblurring component configured to remove distortion from the image data acquired by the imaging device using inertial data of the unmanned aerial vehicle synchronized with the image data acquisition by the imaging device;
   a navigation component configured to navigate the unmanned aerial vehicle to an image acquisition geographic location suitable for acquiring the image data of the area being monitored; and
   a geolocation component configured to determine a real-world geographic location of the unmanned aerial vehicle to an accuracy of five centimeters or less when the imaging component acquires the image data, wherein geolocation data corresponding to the real-world geographic location is stored with image data acquired by the imaging component as observation data for the area being monitored.

16. The unmanned aerial vehicle of claim 15, wherein the geolocation component further includes an inertial management component, wherein the inertial management component uses data from a plurality of sensors to further refine the real-world geographic location to an accuracy of one centimeter or less.

17. The unmanned aerial vehicle of claim 15, further comprising a monitoring component configured to compare the image data to previously acquired image data using the geolocation data for the image data and the previously acquired image data and generate defect data for each defect found as a result of the image data comparison.

18. The unmanned aerial vehicle of claim 15, further comprising a monitoring component configured to autonomously route the unmanned mobile observation device along a pre-determined route to acquire observation data for the area.

19. A system for managing a sensitive area, the system comprising:
   an unmanned aerial vehicle, including:
      an imaging component configured to acquire image data of an area being monitored, wherein the imaging component includes:
         an imaging device configured to acquire image data of the area; and
         a deblurring component configured to remove distortion from the image data acquired by the imaging device using inertial data of the unmanned aerial vehicle synchronized with the image data acquisition by the imaging device;
      a navigation component configured to navigate the unmanned aerial vehicle to an image acquisition geographic location suitable for acquiring the image data of the area being monitored;
      a geolocation component configured to determine a real-world geographic location of the unmanned aerial vehicle to an accuracy of one centimeter or less when the imaging component acquires the image data, wherein geolocation data corresponding to the real-world geographic location is stored with image data acquired by the imaging component as observation data for the area being monitored; and
      a monitoring component configured to compare the image data to previously acquired image data using the geolocation data for the image data and the previously acquired image data and generate defect data for each defect found as a result of the image data comparison; and
   a sensitive area management system that schedules personnel based on the defect data.

20. The system of claim 19, wherein the area includes a set of improvements, wherein the personnel include at least one of: a human inspector or a maintenance person.

* * * * *